United States Patent [19]

Wenger

[11] Patent Number: 5,694,833
[45] Date of Patent: Dec. 9, 1997

[54] SHORT LENGTH TAPERED EXTRUSION COOKING DEVICE

[75] Inventor: Lavon G. Wenger, Sabetha, Kans.

[73] Assignee: Wenger Manufacturing, Inc., Sabetha, Kans.

[21] Appl. No.: 685,893

[22] Filed: Jul. 18, 1996

[51] Int. Cl.$^6$ .................... A23J 1/00; B29B 7/42
[52] U.S. Cl. .................... 99/348; 99/353; 366/82; 366/88; 366/89; 426/516
[58] Field of Search .................. 99/353, 348, 443 C, 99/451; 366/89, 82, 88; 426/272, 506, 516, 802; 425/208, 308, 202, 207

[56] References Cited

U.S. PATENT DOCUMENTS

| | | | |
|---|---|---|---|
| 3,325,865 | 6/1967 | Dunnington et al. | 366/89 |
| 3,881,708 | 5/1975 | Carle | 366/89 |
| 4,963,033 | 10/1990 | Huber et al. | 366/89 |
| 5,490,725 | 2/1996 | Behrens et al. | 366/89 |

FOREIGN PATENT DOCUMENTS

| | | | |
|---|---|---|---|
| 180250 | 10/1935 | Denmark | 366/82 |
| 562152 | 5/1957 | Italy | 366/82 |
| 86969 | 7/1936 | Switzerland | 366/82 |

*Primary Examiner*—Reginald L. Alexander
*Attorney, Agent, or Firm*—Hovey, Williams, Timmons & Collins

[57] ABSTRACT

Improved short length extrusion cooking devices (10) are provided which can achieve product throughput and quality characteristics of conventional long-barrel extruders. The short length extruders (10) of the invention include a relatively short barrel (14) having an inlet (18) and an endmost extrusion die (20). An elongated, helically flighted axially, rotatable screw assembly (22) is positioned within the barrel (14) and is coupled to motive means (39, 39a) for rotation of the assembly (22) at a speed of at least about 500 rpm. The device (10) includes an internal, apertured flow-restricting device (60, 110) which defines a mid-barrel choke point for the material being processed. Preferably, the barrel (14) has an internal bore of generally frustoconical configuration with an effective length to maximum diameter ratio (L/D) of at least about 6.

22 Claims, 1 Drawing Sheet

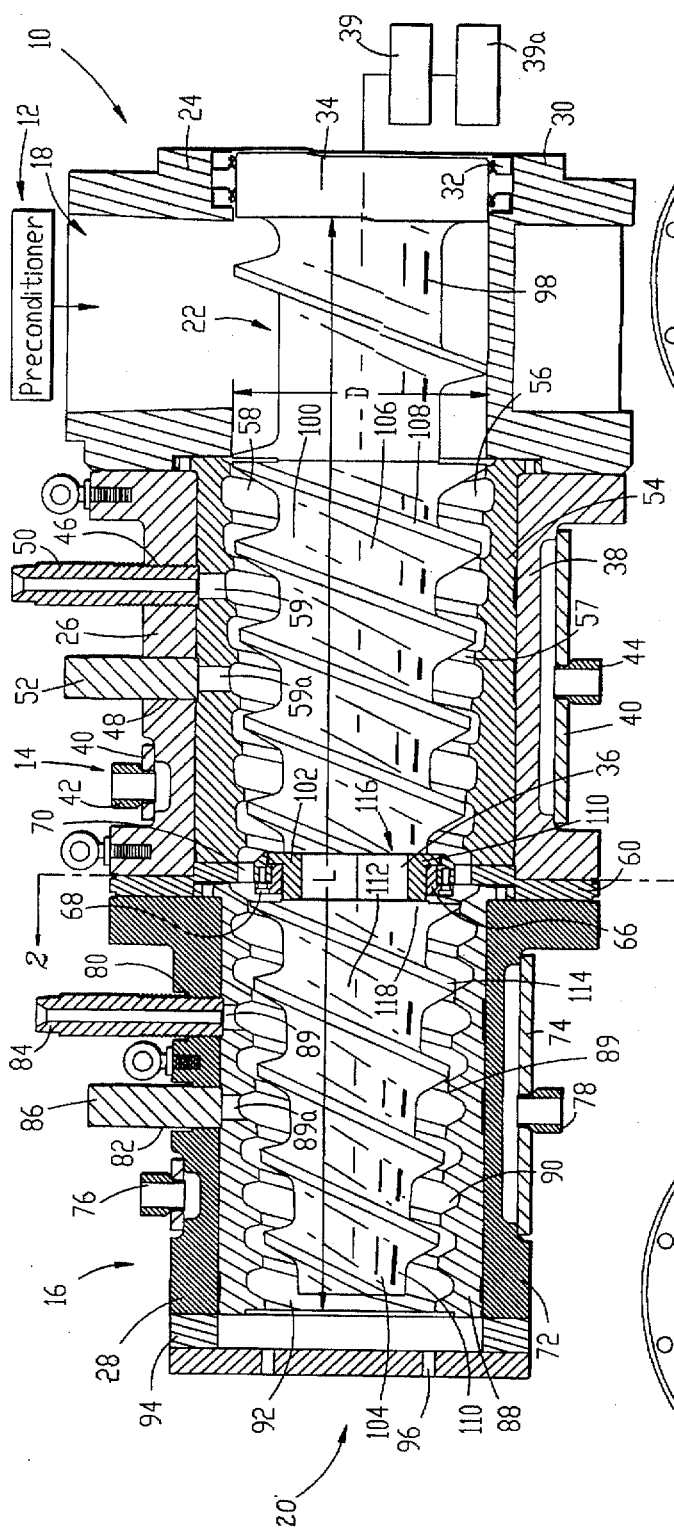
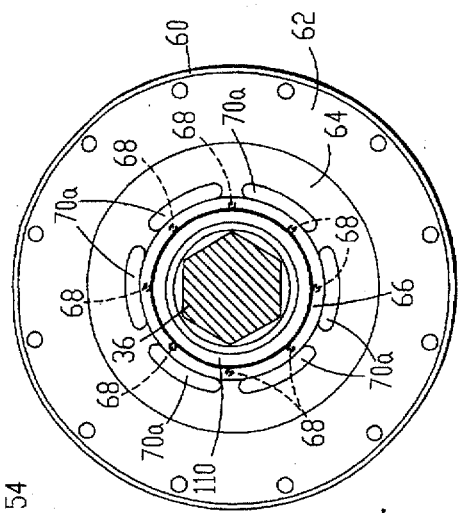
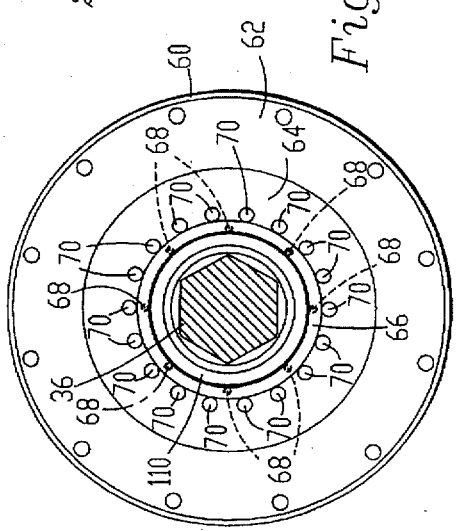
Fig. 1.
Fig. 2.
Fig. 3.

SHORT LENGTH TAPERED EXTRUSION COOKING DEVICE

BACKGROUND OF THE INVENTION

1. Field of the Invention

The present invention is broadly concerned with an improved extrusion cooking device and method wherein the extruder is of minimal length to reduce equipment and maintenance costs. More particularly, the invention pertains to such a device wherein the internal bore of the extruder barrel is of tapered, generally frustoconical configuration and the extruder preferably includes means presenting a material flow restriction intermediate the inlet and extrusion die. Extrusion devices in accordance with the invention are operated at high speed and can essentially match the throughputs and product qualities of much larger machines.

2. Description of the Prior Art

Extrusion cooking devices have long been used in the manufacture of a wide variety of edible and other products such as human and animal feeds. Generally speaking, these types of extruders include an elongated barrel together with one or more internal, helically flighted, axially rotatable extrusion screws therein. The outlet of the extruder barrel is equipped with an apertured extrusion die. In use, a material to be processed is passed into and through the extruder barrel and is subjected to increasing levels of temperature, pressure and shear. As the material emerges from the extruder die, it is fully cooked and shaped and may typically be subdivided using a rotating knife assembly. Conventional extruders of this type are shown in U.S. Pat. Nos. 4,763,569, 4,118,164 and 3,117,006.

Most conventional modern-day extrusion cookers are made up of a series of interconnected tubular barrel heads or sections with the internal flighted screw(s) also being sectionalized and mounted on powered, rotatable shaft(s). In order to achieve the desired level of cook, it has been thought necessary to provide relatively long barrels and associated screws. Thus, many high-output pet food machines may have five to eight barrel sections and have a length of from about 10 to 20 times the screw diameter. As can be appreciated, such long extruders are expensive and moreover present problems associated with properly supporting the extrusion screw(s) within the barrel. However, prior attempts at using relatively short extruders have not met with success, and have been plagued with problems of insufficient cook and/or relatively low yields.

There is accordingly a need in the art for improved, low-cost, short length extruder devices which are essentially equal with conventional long-barrel extruders in terms of product throughput and quality.

SUMMARY OF THE INVENTION

The present invention overcomes the problems outlined above, and provides a short length cooking extruder and method which yields superior products at commercially viable throughputs using an extruder substantially shorter in length than those of conventional design. Broadly speaking, the extruder of the invention includes the usual tubular barrel having an inlet and an outlet and presenting an inner surface defining an elongated bore. The extruder also includes an elongated, helically flighted screw assembly within the bore, motive means for axially rotating the screw assembly, and an apertured extrusion die disposed across the barrel outlet.

However, a number of important structural features are incorporated into the extruders hereof in order to achieve the ends of the invention. Thus, the internal bore of the barrel is preferably of generally frustoconical configuration for at least about 50% of the length of the barrel between the inlet to the extrusion die and presents a generally decreasing cross-sectional area along the bore length; preferably, the barrel bore is of tapered, frustoconical configuration for substantially the entirety of the barrel length between the inlet and outlet. Moreover, the preferred extruder includes structure defining a material flow restriction, which is preferably in the form of an apertured flow-restricting device; this generates a mid-barrel die resulting in a choke region of material during operation of the extruder. The screw assembly and flow-restriction are cooperatively designed so that the material displacement per revolution of the screw assembly adjacent the upstream margin of the flow-restriction is less than the material displacement per revolution adjacent the downstream margin of the flow-restriction.

Normally, the inner bore-defining surface of the extruder barrel is configured to present spaced, helical rib sections along the length thereof; these ribs assist in mixing and cooking of the material during travel along the short length of the extruder barrel. This effect is augmented by the relatively high rotational speeds of the screw assembly; in practice, the screw assembly is rotated at a speed of at least about 500 rpm, more preferably at least about 550 rpm, and even more preferably at least about 600 rpm. The most preferred range of rpm is from about 600–1000.

The short length extruders of the invention have a length to maximum diameter ratio (L/D ratio) of up to about 6, and more preferably from about 3–6. Thus, devices in accordance with the invention can be produced at a significantly lower cost as compared with conventional cooking extruders. Furthermore, maintenance and parts replacement costs are lessened.

BRIEF DESCRIPTION OF THE DRAWINGS

FIG. 1 is a vertical sectional view depicting a preferred short length extruder in accordance with the invention;

FIG. 2 is a sectional view taken along line 2—2 of FIG. 1 and depicting the mid-barrel die assembly of the extruder; and FIG. 3 is a sectional view similar to FIG. 2 but illustrating an alternative mid-barrel die design.

DETAILED DESCRIPTION OF THE PREFERRED EMBODIMENT

Turning now to the drawings, a short length extruder assembly 10 is illustrated in FIG. 1. Broadly speaking, the assembly 10 includes a Preconditioner 12 and an extruder 14. The latter includes an elongated tubular barrel 16 having an inlet 18 and an endmost, apertured extrusion die 20. An elongated, flighted, axially rotatable screw assembly 22 is disposed within barrel 16 along the length thereof.

In more detail, the preconditioned 12 is designed to initially moisturize and partially precook dry ingredients prior to passage thereof as a dough or the like into the inlet 18 of extruder 14. To this end, the preconditioned 12 is typically in the form of an elongated chamber equipped with rotatable internal paddles as well as injection ports for water and/or steam. A variety of preconditioners may be used in the context of the invention. However, it is particularly preferred to use Wenger DDC preconditioners of the type described in U.S. Pat. No. 4,752,139, incorporated by reference herein.

In the embodiment illustrated, the barrel 16 is made up of three axially aligned and interconnected tubular head sections, namely inlet head 24 and second and third sections 26, 28. The inlet head 24 is configured to present the upwardly opening extruder inlet 18 and is positioned beneath the outlet of Preconditioner 12 as shown. In addition, the inlet head 24 has an apertured end wall 30 equipped with seals 32 for engaging seal block 34. The screw assembly 22 is mounted on hexagonal drive shaft 36 and is rotated via schematically depicted conventional bearing housing 39 and electric motor 39a.

The second head 26 includes an outer metallic section 38 equipped with an external jacket 40. The latter has an inlet 42 and an outlet 44 so as to permit introduction of heating or cooling media (e.g., cold water or steam) into the jacket, thus allowing indirect temperature control for the head 26. In addition, the section 38 is provided with a pair of through apertures 46, 48. As shown, an injection nipple 50 is located within aperture 46, whereas the aperture 48 has a removable plug 52 therein.

The overall head 26 further includes a removable, stationary metallic sleeve 54 secured to the inner face of section 38. The sleeve 54 has an internal surface 56 presenting helical rib sections 57 which defines an axially extending bore 58. As shown, the thickness of sleeve 54 increases along the length thereof such that the diameter of bore 58 decreases between inlet head 24 and third head 28. The sleeve 54 also has transverse apertures 59 and 59a therethrough which are in alignment with barrel section apertures 46, 48 described previously. The end of head 26 remote from inlet head 24 is equipped with an apertured stator 60 (see FIG. 2). The stator 60 includes an outboard flange 62 which is sandwiched between the heads 26, 28 as shown, as well as an inwardly extending annular segment. The segment 64 in turn has an innermost bearing ring 66 secured thereto by means of screws 68. In addition, the segment 64 is provided with a series of six circumferentially spaced, circular holes 70 therethrough. FIG. 3 illustrates another rotor/stator assembly which is identical with that depicted in FIG. 2, save for the fact that, in lieu of the holes 70, a series of six circumferentially spaced slots 70a are provided.

Third head 28 is similar in many respects to head 26 and includes an outer tubular section 72 and an outboard jacket 74, the latter equipped with an inlet 76 and outlet 78 for introduction of indirect cooling or heating media. Furthermore, the section 72 has transverse openings 80, 82 therethrough which respectively receive nipple 84 and removable plug 86.

A stationary, removable metallic sleeve 88 is positioned within section 72 and has transverse apertures 89, 89a therethrough in registry with the apertures 80, 82. The inner surface 90 of sleeve 88 presents helical ribs 89 and defines an axially extending central bore 92. The bore 92 decreases in effective diameter between the end of barrel section 28 adjacent section 26 and the end of the section 28 proximal to die 20.

The barrel 16 is completed by provision of a short annular spacer 94 positioned adjacent the end of third barrel section 28 remote from barrel section 26, together with endmost die 20. The latter in the embodiment shown is a simple metallic plate having a series of die holes 96 therethrough.

The screw assembly 22 includes four rotatable elements mounted on the shaft 36 and interconnected in an end-to-end relationship. In particular, assembly 22 has an inlet screw section 98, a first screw section 100, bearing rotor 102, and third screw section 104.

The first screw section 100 includes an elongated central shaft 106 presenting an outer, generally frustoconical surface and outwardly extending helical flighting 108. It is noteworthy that the pitch of flighting 108 is oriented at a pitch angle which is less than the pitch angle of the helical flighting 57 defined by surface 56 of sleeve 54. Moreover, it will be seen that the overall configuration of the screw section 100 conforms with the decreasing diameter of bore 58, i.e., the outer periphery of the flighting 108 progressively decreases from the inlet end of the screw section 100 to the outlet end thereof adjacent rotor 102.

The rotor 102 is mounted on shaft 36 and includes an outermost, somewhat L-shaped in cross-section annular bearing 110 which is closely adjacent annular bearing segment 66 of stator 60. The rotor 102 and stator 60 thus assists in stabilizing the screw assembly 22 during high speed rotation thereof.

The third screw section 104 is very similar to screw section 100. That is, the section 104 includes an elongated central shaft 112 presenting an outermost, frustoconical surface and helical flighting 114; the latter is oriented at a pitch angle which is less than the pitch angle of the ribs 89.

Again referring to FIG. 1, it will be observed that the overall extruder bore defined by the sleeves 54 and 88 is of generally frustoconical configuration leading from inlet 18 to die 20, i.e., the barrel bore presents a generally decreasing cross-sectional area along the length thereof. Moreover, it will be seen that the effective length of the extruder from the remote end of inlet 18 to the end of barrel 16 (shown as dimension "L" in FIG. 1) versus the maximum diameter of the barrel bore (dimension "D" in FIG. 1) is relatively low, and preferably up to about 6; the more preferred L/D ratio is from about 3–6. As used herein, "L/D ratio" refers to the ratio measured in accordance with the exemplary length and diameter illustrated in FIG. 1.

It will also be understood that the stator 60 and rotor 102 cooperatively present a flow-restricting device intermediate the length of the barrel at the region of interconnection between barrel sections 26 and 28. The overall flow-restricting device thus presents an upstream face 116 and an opposed downstream face 118. The screw assembly 22 and the flow-restricting device 60, 102 are cooperatively designed so that the material displacement per revolution of the assembly 22 adjacent face 116 is smaller than the material displacement per revolution of the assembly 22 adjacent the downstream face 118. Moreover, the assembly 22 and device 60, 102 are designed so as to substantially continuously maintain the slots 70 forming a part of the flow-restricting device full of material during operation of the extruder. In more detail, the material displacement per revolution of the screw assembly 22 adjacent downstream face 118 is up to 40% greater than the material displacement of the screw adjacent the upstream face 118; more particularly, the displacement adjacent face 118 exceeds that adjacent face 116 by a factor of from about 15–40%. Also, the depressions between adjacent ribs 89 in sleeve 88 are greater than the corresponding depressions in sleeve 54. As a consequence, the free volume within the barrel bore downstream of and adjacent flow-restricting device 60, 102 is greater than the free volume adjacent and upstream of the flow-restricting device. Quantitatively speaking, the free volume within head 28 at the region of face 118 is up to about 30% greater than the free volume within head 26 at the region of face 116, more preferably from 15–30% greater.

It has been discovered that the short length extruders of the invention should be operated at the relatively high rotation speeds described above. Such high speed operation, in conjunction with the other preferred configuration details, gives high throughputs together with good quality of products.

In typical operations employing extruders in accordance with the invention, an edible material to be processed is first formulated and then Preconditioner, followed by passage into and through the short length extruder. In the preferred Preconditioner, the material is moisturized and at least partially cooked. Preconditioning is normally carried out so that the product leaving the Preconditioned has a total moisture content of from about 15–40% by weight, and more preferably from about 22–28% by weight. The residence time in the preconditioner is usually from about 15–150 seconds, and more preferably from about 90–150 seconds; and the maximum temperature in the Preconditioner ranges from about 55°–212° F., and more preferably from about 180°–200° F.

During passage through the extruder, the material is subjected to increasing levels of temperature and shear and is normally fully cooked as it emerges from the extrusion die. Typical residence times of the material in the extruder barrel range from about 10–40 seconds, and more preferably from, about 20–30 seconds. Maximum pressure levels achieved in the extruder barrel are normally from about 150–1000 psi, and more preferably from about 300–500 psi. The maximum temperature level achieved in the extruder barrel is from about 220°–300° F., and more preferably from about 230°–250° F.

During extrusion processing, the apertures of the flow-restricting device 60, 102 are completely filled so as to create a choke in the barrel at the zone of the flow-restricting device and a pressure differential across the device 60, 102 (i.e., the pressure is higher at face 116 as compared with the pressure of face 118). Moreover, owing to the fact that the displacement per revolution of the screw assembly 22 adjacent downstream face 118 is greater than that proximal to the upstream face 116, the free volume downstream of the flow-restriction device is not fully choked with material. At a zone immediately adjacent the die 20, another choke of material is formed in order to assure smooth extrusion of the product through the die apertures.

The extruders and methods in accordance with the invention are particularly suited for the preparation of feed products, especially animal feed products. Such products may be of the expanded variety, such as typical pet foods, or more dense pellet-type products typically fed to pigs. In such uses, the starting materials usually include a high proportion of grain at a level of at least about 40% by weight (e.g., corn, wheat, soy, milo, oats), and may include fats and other incidental ingredients. Expanded products in accordance with the invention would typically have a final (i.e., after drying) density of from about 15–25 kg/m$^3$, whereas denser pellet-type products would normally have a final density of from about 30–50 kg/m$^3$. Broadly, therefore, products of the invention would have final densities in the range of from about 15–50 kg/m$^3$.

The following examples set forth preferred extrusion apparatus and methods in accordance with the invention. It is to be understood that the invention is not so limited and nothing in the examples should be taken as a limitation upon the overall scope of the invention.

EXAMPLE 1

In this example, a short length extruder in combination with a Preconditioner was employed in the manufacture of high quality pet food at commercial production rates.

The extruder was of the type depicted in FIG. 1, and consisted of three heads. In particular, the extruder configuration used in Runs #1, #2 and #4 was made up of the following components (where all parts are identified with Wenger Mfg. Co. part numbers): extruder barrel—65695-001 (inlet head); 65676-001 (head No. 2); and 65689-001 (head No. 3). Head No. 2 was equipped with internal liner 65691-001 and a stator 76598-001 between the second and third heads. Screw assembly—76597-002 (shaft); 65670-001 (inlet screw); 65671-001 (second screw section); 65906-003 (stationary shearlock between second and third screw sections comprising 65907-001 (rotor) and 65909-001 (stator)); and 65675-001 (third screw section). Final die—65534-009 (1" spacer); 65421-001 (die plate); and 31350-779 (die insert giving ⅜" die openings). A rotating knife assembly was positioned adjacent the outlet of the die for cutting the extrudate into a convenient size. The knife assembly included the following: 19462-023 (knife holder) and ten knife blades (19512-003). The extruder employed on Runs #3 and #5 was identical with that described above, except that the shaft employed was Wenger Part No. 76597-001 and the final screw section (Wenger Part No. 65675-005) was of cut flight configuration.

The Preconditioner used in both of these setups was a Wenger DDC Preconditioner having the standard 60-60 configuration.

In all of the five test runs, the starting pet food recipe was made up of 24% by weight poultry meal, 54% by weight corn meal, 8% by weight wheat, 8% by weight corn gluten meal, and 6% by weight soybean meal. In each case, the starting material was fed into and through the Preconditioner for moisturizing and partial cooking thereof, followed by passage through the three head extruder. Water and sometimes steam was injected into the extruder barrel at the second and third head injection ports. Subsequent to extrusion, the product was conventionally dried to a moisture content of about 9–11% by weight.

The following table sets forth the operating conditions for the Preconditioned and extruder devices in the five runs.

TABLE 1

|  |  | RUN #1 | RUN #2 | RUN #3 | RUN #4 | RUN #5 |
| --- | --- | --- | --- | --- | --- | --- |
| RAW MATERIAL INFORMATION: |  |  |  |  |  |  |
| Dry Recipe Density | kg/m$^3$ | 577 | 577 | 577 | 577 | 577 |
| Dry Recipe Rate | kg/hr | 2000 | 3000 | 3000 | 3500 | 3000 |
| Feed Screw Speed | rpm | 53 | 76 | 72 | 87 | 48 |
| PRECONDITIONING INFORMATION |  |  |  |  |  |  |
| Preconditioner | rpm | 125/250 | 125/250 | 125/250 | 125/250 | 125/250 |
| Steam Flow to Preconditioner | kg/hr | 200 | 285 | 270 | 280 | 271 |
| Water Flow to Preconditioner | kg/hr | 300 | 540 | 540 | 655 | 482 |

TABLE 1-continued

|  |  | RUN #1 | RUN #2 | RUN #3 | RUN #4 | RUN #5 |
|---|---|---|---|---|---|---|
| Preconditioner Water Temperature | °C. |  |  |  | 61 | 61 |
| EXTRUSION INFORMATION: |  |  |  |  |  |  |
| Extruder Shaft Speed | rpm | 592 | 592 | 592 | 592 | 592 |
| Motor Load | % | 63 | 60 | 83 | 88 | 63 |
| Steam Flow to Extruder | kg/hr | — | — | — | — | 60 |
| Water Flow to Extruder | kg/hr | 30 | 60 | 76 | 85 | 60 |
| Control/Temperature-1st Head | °C. |  |  |  | 83 | 87 |
| Control/Temperature-2nd Head | °C. | 86 | 109 | 101 | 102 | 101 |
| Control/Temperature-3rd Head | °C. | 93 | 110 | 76 | 98 | 98 |
| Head/Pressure | kPa | 3/NA | 3/NA | 3/2068 | 2200 | 2250 |
| FINAL PRODUCT INFORMATION: |  |  |  |  |  |  |
| Extruder Discharge Rate | kg/hr | 320 | 400 | 320 |  |  |
| Extruder Discharge Density | kg/m³ |  |  |  | 368 | 352 |
| Extruder Performance |  | Stable | Stable | Stable | Stable | Stable |
| Duration of Run | min. | 15 | 15 | 8 | 15 | 30 |
| Final Product Description | in. | 3/8 chunk | 3/8 chunk | 3/8 chunk | 3/8 pellet | 3/8 pellet |

All of the runs gave commercially acceptable, fully cooked and formed products. The bulk density of the product from Run #1 was found to be about 19 lbs/ft³.

EXAMPLE 2

In this example, a short length extruder/Preconditioner was used to manufacture a high quality, dense, hard pig finishing feed. The resultant product was equivalent if not superior to those conventionally produced using an expander and pellet mill.

The extruder was of the type depicted in FIG. 1 except that it did not include the rotor/stator assembly defining a mid-barrel material flow restriction. Specifically, the three-head extruder configuration used in Runs 6 and 7 was made up of the following components (where all parts are identified with Wenger Mfg. Co. part numbers): extruder barrel—65695-001 (inlet head); 65676-001 (head No. 2); and 65689-001 (head No. 3). Head No. 2 was equipped with internal sleeve 65691-001, whereas head 3 also had an internal sleeve, 76598-001. Screw assembly—76597-002 (shaft); 65670-001 (inlet screw); 65671-001 (first screw section); 65906-001 (second screw section) and 65676-001 (third screw section). Final die—66532-103 BH, 65534-009 AD, 74010-953 NA, 74010-954 NA, with 13 inserts. A rotating knife assembly was positioned adjacent the outlet of the die for cutting the extrudate into a convenient size. The knife assembly included the following: 19462-001 (knife blade holder) and six knife blades (19430-007).

In the case of Runs 8 and 9, the extruder configuration was made up of the following components: extruder barrel—65695-001 (inlet head); 65676-001 (head No. 2); and 65689-001 (head No. 3). Head No. 2 was equipped with internal sleeve 65691-001, whereas head 3 also had an internal sleeve, 76598-001. Screw assembly—76597-002 (shaft); 65670-001 (inlet screw); 65671-001 (first screw section); 65658-015 (second screw section); and 65675-001 (third screw section). Final die—6534-009 AD and 65421-001 BH. A rotating knife assembly was positioned adjacent the outlet of the die for cutting the extrudate into a convenient size. The knife assembly included the following: 19607-017 (knife blade holder) and five knife blades.

The Preconditioner used in both of these setups was a Wenger Model 16 DDC Preconditioner having Configuration No. 377. The left and right shafts were each equipped with a total of sixty beaters.

In Runs 6–9 inclusive, the starting recipe was made up of 76.96% by weight milo, 15.95% by weight soybean meal, 4.69% by weight tallow, 0.94% by weight salt, 0.94% by weight calcium carbonate, 0.41% by weight vitamin premix, and 0.11% by weight lysine. In each case, the starting material is fed into and through the Preconditioner for moisturizing and partial cooking thereof followed by passage through the three head extruder. Water was injected into the extruder barrel in Runs 7–9. Runs 6 and 7 were somewhat unstable but Runs 8 and 9 were stable and gave good, high density pig feeds. Subsequent to extrusion, the product was conventionally dried using a multiple pass dryer to achieve dryer discharge densities of 35 kg/m³ (Run 6), 36 kg/m³ (Run 7), 45.4 kg/m³ (Run 8), and 45.0 kg/m³ (Run 9).

The following table sets forth the operating conditions for the Preconditioner and extruder devices in the four runs.

TABLE 2

|  |  | RUN #6 | RUN #7 | RUN #8 | RUN #9 |
|---|---|---|---|---|---|
| RAW MATERIAL INFORMATION: |  |  |  |  |  |
| Dry Recipe Density | kg/m³ | 688 | 688 | 688 | 688 |
| Dry Recipe Rate | kg/hr | 1500 | 1800 | 3000 | 4000 |
| Feed Screw Speed | rpm | 31 | 37 | 64 | 78 |
| PRECONDITIONING INFORMATION |  |  |  |  |  |
| Steam Flow to Preconditioner | kg/hr | 62 | 54 | 210 | 283 |
| Water Flow to Preconditioner | kg/hr | 182 | 72 | 60 | 80 |
| Preconditioner Additive 1 Rate | kg/hr | 75 | 36 | 0 | 0 |
| Preconditioner Discharge Temp. | °C. | 69 | 73 | 85 | 86 |
| EXTRUSION INFORMATION: |  |  |  |  |  |
| Extruder Shaft Speed | rpm | 592 | 52 | 529 | 519 |
| Motor Load | % | 70 | 95 | 47 | 38 |
| Water Flow to Extruder | kg/hr | — | 36 | 30 | 40 |

TABLE 2-continued

| | | RUN #6 | RUN #7 | RUN #8 | RUN #9 |
|---|---|---|---|---|---|
| Control/Temperature-2nd Head | °C. | 66 | 58 | 56 | 49 |
| Control/Temperature-3rd Head | °C. | 90 | 98 | 106 | 117 |
| Head/Pressure | kPa | 340 | 304 | 502 | 3/690 |
| Knife Drive Speed | rpm | 350 | 350 | 610 | 770 |
| FINAL PRODUCT INFORMATION: | | | | | |
| Extruder Discharge Density | kg/m³ | 54.87 | 560.9 | 675 | 673 |
| Final Product Description | | pig feed | pig feed | pig feed | pig feed |
| Run Rating | | Fair | Fair | Good | Good |

The higher densities achieved in Runs 8 and 9 are believed chiefly attributable to the different die assembly employed as compared with Runs 6 and 7.

Although the extruder device specifically described herein is of the single screw type, it will be understood that short length twin screw extruders may also be fabricated and used in accordance with the invention.

I claim:

1. A short length cooking extruder comprising:

an elongated tubular barrel having a material inlet and a spaced material outlet and presenting an inner surface defining an elongated bore;

an elongated, helically flighted screw assembly positioned within said bore;

means for axially rotating said screw assembly at a rotational speed of at least 500 rpm; and an apertured extrusion die disposed across said material outlet, said bore being of generally frustoconical configuration for at least 50% of the length of the bore from said inlet to said die and presenting a generally decreasing cross-sectional area as said die is approached, there being means defining a material flow-restriction within said barrel and intermediate said inlet and outlet, said flow-restriction defining means presenting an upstream margin and an opposed downstream margin, said upstream margin being closer to said inlet than said downstream margin, the material displacement per revolution of said screw assembly adjacent said upstream margin being smaller than the material displacement per revolution of said screw assembly adjacent said downstream margin, said extruder having a L/D ratio of up to 6.

2. The extruder of claim 1, said inner bore-defining surface of said barrel presenting a series of spaced, helical rib sections along the length thereof.

3. The extruder of claim 1, said flow-restriction defining means comprising an apertured flow-restricting device presenting an upstream face and an opposed downstream face, said screw assembly and flow-restricting device being cooperatively configured for substantially continuously maintaining the apertures of said flow-restricting device full of material during operation of said extruder.

4. The extruder of claim 3, said flow-restricting device comprising an apertured stator secured to said barrel, and a complemental rotor forming a part of said screw assembly.

5. The extruder of claim 1, the free volume within said barrel adjacent said upstream margin being greater than the free volume adjacent said downstream margin.

6. The extruder of claim 1, including means for injecting a fluid through said barrel into the confines of said bore.

7. The extruder of claim 1, said extruder having one screw assembly within said bore.

8. A short length cooking extruder comprising:

an elongated tubular barrel having a material inlet and a spaced material outlet and presenting an inner surface defining an elongated bore;

an elongated, helically righted screw assembly positioned within said bore;

means for axially rotating said screw assembly at a rotational speed of at least 500 rpm; and an apertured extrusion die disposed across said material outlet, said bore being of generally frustoconical configuration for at least 50% of the length of said bore from said inlet to said die and presenting a generally decreasing cross-sectional area as said die is approached, said barrel inner surface being configured to present a series of inwardly extending helical rib sections along the length thereof, said extruder having a L/D ratio of up to 6.

9. The extruder of claim 8, including means for injecting a fluid through said barrel into the confines of said bore.

10. The extruder of claim 8, said extruder having one screw assembly within said bore.

11. A short length cooking extruder comprising:

an elongated tubular barrel having a material inlet and a spaced material outlet and presenting an inner surface with a series of spaced, helical rib sections along the length thereof and defining an elongated bore;

an elongated, helically righted screw assembly positioned within said bore;

means for axially rotating said screw assembly; and an apertured extrusion die disposed across said material outlet, said bore being of generally frustoconical configuration from said inlet to said die to present a generally decreasing cross-sectional area along the length of the bore as said die is approached, there being an apertured material flow-restricting device within said barrel and intermediate said inlet and outlet, said flow-restricting device presenting an upstream face and an opposed downstream face, said upstream face being closer to said inlet than said downstream face, the material displacement per revolution of said screw assembly adjacent said upstream face of said flow-restricting device being smaller than the material displacement per revolution of said screw assembly adjacent said downstream face of said flow-restricting device, said screw assembly and flow-restricting device being cooperatively configured for substantially continuously maintaining the apertures of said flow-restricting device full of material during operation of said extruder, said rotating means being operable for rotating said screw assembly within said barrel at a rotational speed of at least 500 rpm, said extruder having a L/D ratio of up to 6.

12. The extruder of claim 11 said extruder having a single screw assembly within said bore.

13. A method of extrusion cooking an edible material comprising the steps of:

passing said edible material into the inlet of an elongated extruder having a barrel equipped with an endmost extrusion die and an internal, axially rotatable, flighted screw assembly within the barrel, and rotating said screw assembly at a speed of at least 500 rpm for advancing said material from said inlet along the length of said barrel and out said extrusion die for heating and at least partial cooking of the edible material, and, during said material advancement, causing said material to completely fill and choke said barrel at a zone intermediate said inlet and said extrusion die, the material displacement per revolution of said screw assembly adjacent said zone and proximal to said inlet being smaller than the material displacement per revolution of said screw assembly adjacent said zone and proximal to said die.

14. The method of claim 13, including the step of passing said material through an apertured flow-restricting device at said zone, said screw assembly and flow-restricting device substantially continuously maintaining the apertures of the flow-restricting device full of said material during operation of said extruder.

15. The method of claim 13, including the step of passing said material through a Preconditioner in order to moisturize and partially cook the material prior to passage of said material into said inlet.

16. The method of claim 13, including the step of injecting moisture into said barrel during rotation of said screw assembly.

17. The method of claim 13, said extruder being a single screw extruder.

18. A short length cooking extruder comprising:

an elongated tubular barrel having a material inlet and a spaced material outlet and presenting an inner surface defining an elongated bore which is of general frusto-conical configuration over at least a portion of the length thereof;

an elongated, helically flighted screw assembly positioned within said bore;

means for axially rotating said screw assembly at a rotational speed of at least 500 rpm: and an apertured extrusion die disposed across said material outlet, there being means defining a material flow-restriction within said barrel and intermediate said inlet and outlet, said flow-restriction defining means presenting an upstream margin and an opposed downstream margin, said upstream margin being closer to said inlet than said downstream margin, said extruder having a L/D ratio of up to 6.

19. The extruder of claim 18, said bore being of tapered, generally frustoconical configuration throughout substantially the entirety of the length thereof.

20. The extruder of claim 18, said flow-restriction defining means comprising an apertured material flow-restricting device within said barrel and intermediate said inlet and said outlet.

21. A short length cooking extruder comprising:

an elongated tubular barrel having a material inlet and a spaced material outlet and presenting an inner surface defining an elongated bore which is of general frusto-conical configuration over at least a portion of the length thereof;

an elongated, helically flighted screw assembly positioned within said bore;

means for axially rotating said screw assembly at a rotational speed of at least 500 rpm; and an apertured extrusion die disposed across said material outlet, said extruder having a L/D ratio of up to 6.

22. A method of extrusion cooking an edible material comprising the steps of:

passing said edible material into the inlet of an elongated extruder having a barrel equipped with an endmost extrusion die and an internal, axially rotatable, flighted screw assembly within the barrel, said extruder having an L/D ratio of up to 6; and rotating said screw assembly at a speed of at least 500 rpm for advancing said material from said inlet along the length of said barrel and out said extrusion die for heating and at least partial cooking of the edible material.

* * * * *